Figure 1:
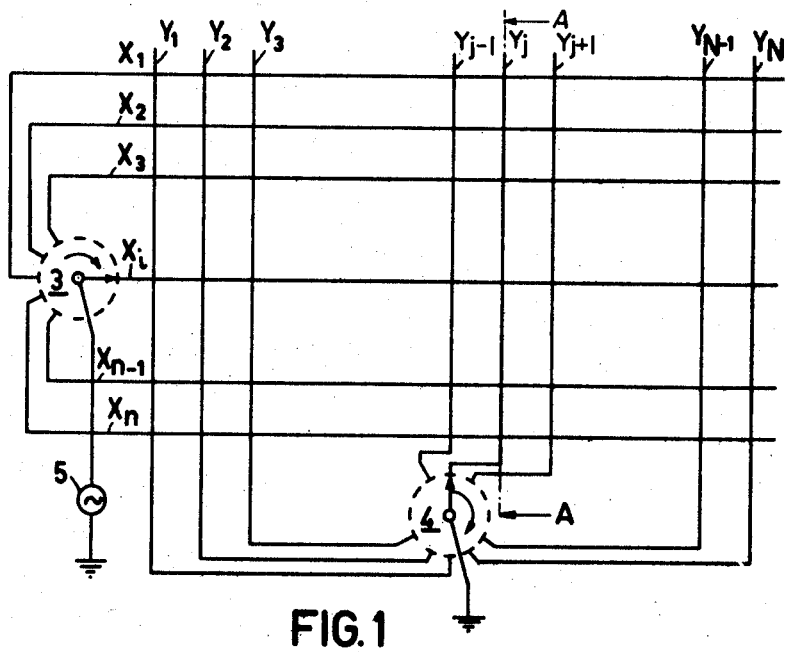

OUTPUT

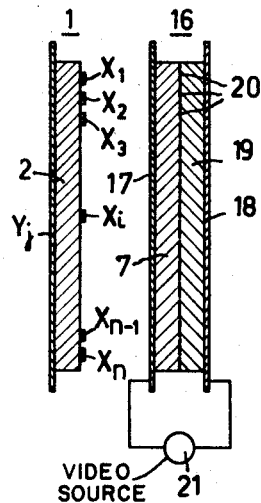
FIG. 4
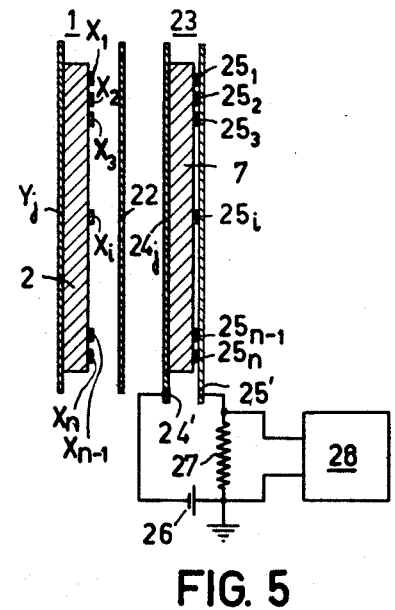
FIG. 5
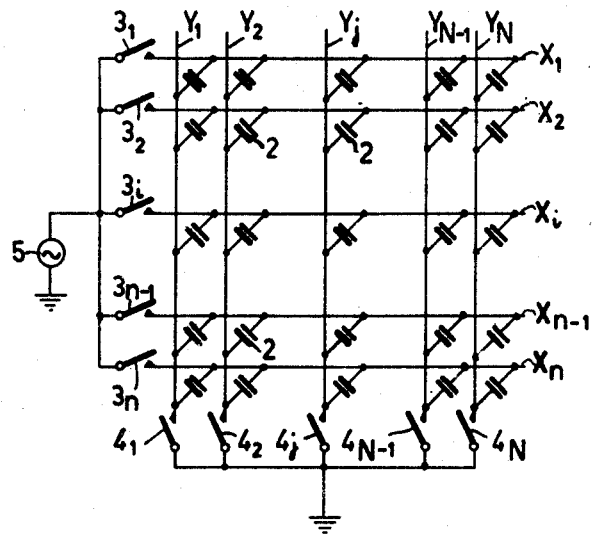
FIG. 6ᵃ

Oct. 6, 1964    J. G. VAN SANTEN ETAL    3,152,257
CROSSED-PARALLEL-CONDUCTORS SYSTEM USING ELECTROLUMINESCENT
AND PHOTOCONDUCTIVE LAYERS
Filed Nov. 14, 1960    3 Sheets-Sheet 3

INVENTOR
JOHANNES G. VAN SANTEN
HEIN KOELMANS
BY
AGENT

United States Patent Office 3,152,257
Patented Oct. 6, 1964

3,152,257
CROSSED-PARALLEL-CONDUCTORS SYSTEM USING ELECTROLUMINESCENT AND PHOTOCONDUCTIVE LAYERS
Johannes Gerrit van Santen and Hein Koelmans, Eindhoven, Netherlands, assignors to North American Philips Company, Inc., New York, N.Y., a corporation of Delaware
Filed Nov. 14, 1960, Ser. No. 69,102
Claims priority, application Netherlands Nov. 30, 1959
7 Claims. (Cl. 250—209)

The invention relates to a crossed-parallel-conductors system and an associated circuit arrangement to be controlled by this system, the crossed-parallel-conductors system comprising two groups of parallel conductors $x$ and $y$, each conductor of the $x$ group crossing the conductors of the $y$ group and a layer of electroluminescent material being interposed between said two groups, while a potential difference can be applied at will between one of the $x$-conductors and one of the $y$-conductors by means of switches connected to the $x$- and $y$-conductors. The radiation produced by the electroluminescent layer due to the potential difference applied is directed to a photoconductive layer arranged opposite the crossed-parallel-conductors system and forming part of the circuit arrangement, the impedance of which must be reduced for switching purposes on the spot of the crossing of the $x$- and $y$-conductors between which the potential difference is applied.

Such crossed-parallel-conductors systems always have a limitation in that, when the potential difference is applied between one $x$-conductor and one $y$-conductor, not only the part of the electroluminescent layer at the crossing point of the two conductors concerned luminesces, but also all parts of this layer associated with the cross formed by these $x$- and $y$-conductors luminesce, although to a lesser degree than at the said crossing point.

If no steps are taken to avoid this so-called cross effect or cross-talk not only the impedance of the part of the photoconductive layer situated opposite the desired crossing, but also of all remaining parts of the photoconductive layer opposite the luminescent cross is reduced.

In order to avoid this cross effect, it is already known from the U.S. Patent No. 2,874,308 to interpose between the two groups of conductors $x$ and $y$ of the crossed-parallel-conductors system not only an electroluminescent layer but also a diode layer.

However, this means an additional layer which furthermore must satisfy the requirement that conduction in this diode layer must be avoided, that is to say, that conduction through this diode layer between the conductors of one group with which this layer is in contact must be avoided, since otherwise the desired potential pattern for the crossed-parallel-conductors system cannot be obtained and furthermore decoupling by means of the diodes is much less effective.

Especially when the crossed-parallel-conductors system comprises a large number of $x$- and $y$-conductors, for example for scanning in television apparatus, the mutual insulation of the diodes desired at the crossings only gives rise to great difficulty. The structure of such a crossed-parallel-conductors systems is very complicated, as may be seen from the structural drawings of the said U.S. patent.

In the crossed-parallel-conductors system and the circuit arrangement to be controlled thereby, however, no additional diode layer need be provided and hence the crossed-parallel-conductors system is greatly simplified if, in accordance with the invention, the system with its associated circuit arrangement is characterized in that the photoconductive layer is a superlinear photoconductive layer, which exhibits the property that its conductance (inverse of its impedance) is a non-linear function of the intensity of the radiation incident thereon.

As will be described more fully hereinafter, according to the principle of the invention, in those cases in which the crossed-parallel-conductors system is used to control a circuit arrangement provided with a photoconductive layer, decoupling can be shifted from the crossed-parallel-conductors system to the circuit arrangement so that solely by a proper choice of the photoconductive layer, not only a saving in cost is obtained, but also the crossed-parallel-conductors system structure can be much simpler.

Figure 2:
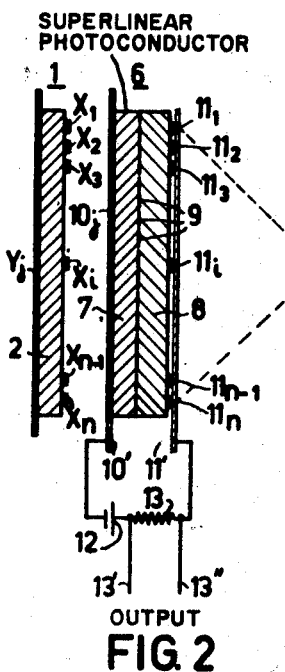
Figure 3:
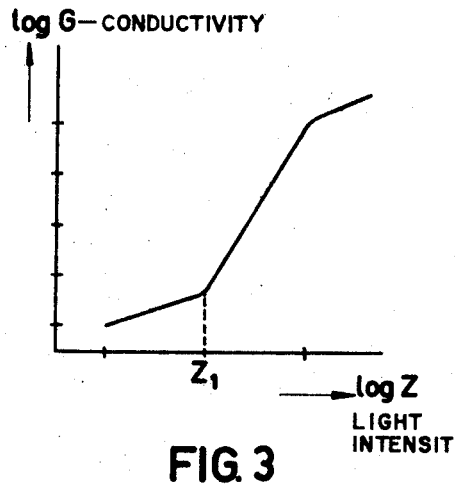
Figure 6B:
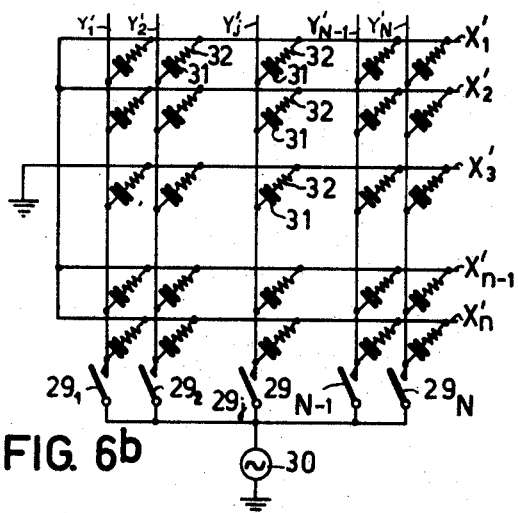
Figure 6C:
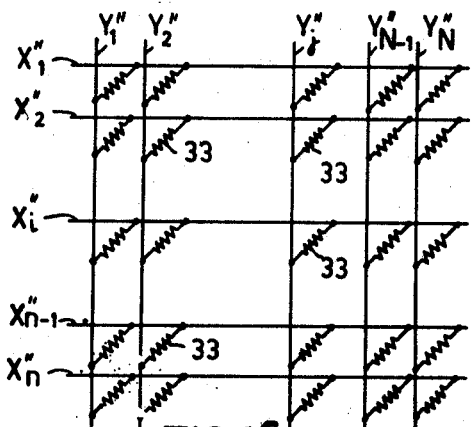
Figure 7:
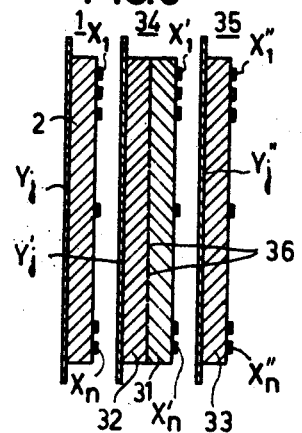

A few possible embodiments of crossed-parallel-conductors systems and circuit arrangements to be controlled by them in accordance with the invention will now be described more fully by way of example with reference to the accompanying drawing, in which:

FIGURE 1 shows a crossed-parallel-conductors system in which an electroluminescent layer is interposed between two groups of conductors, FIGURE 2 is a diagrammatic cross-sectional view of a portion of the crossed-parallel-conductors system of FIGURE 1 and of a circuit arrangement to be controlled by this system, which circuit arrangement in the case shown serves for recording images, FIGURE 3 is a characteristic conductivity-radiation intensity curve of a superlinear photoconductor, FIGURE 4 is a cross-sectional view of a crossed-parallel-conductors system and of a circuit arrangement for the reproduction of television images, FIGURE 5 shows a crossed-parallel-conductors system which in cooperation with a circuit arrangement is capable of reading information recorded in a punched card, FIGURES 6a, 6b and 6c show three associated crossed-parallel-conductors systems, and FIGURE 7 shows the set-up of the crossed-parallel-conductors systems of FIGURE 6.

In FIGURE 1, parallel conductors $x_1$ to $x_n$ represent the group of horizontal conductors and parallel conductors $y_1$ to $y_N$ represent the group of vertical conductors of a crossed-parallel-conductors system. A diagrammatic sectional view of the screen portion of this system taken on the line A—A is shown in FIGURE 2 and designated 1. An electroluminescent layer 2, which may consist of zinc selenide (ZnSe) activated with $2 \times 10^{-4}$ copper (Cu) atoms per molecule of zinc selenide, is interposed between the two groups of conductors.

When the crossed-parallel-conductors system is scanned by means of switches 3 and 4, an alternating voltage source can be connected in sequence to each of the $x$-conductors and at the same time the $y$-conductors can be successively connected to earth. Scanning of the $y$-conductors is performed at a rate so much higher than scanning of the $x$-conductors that all $y$-conductors are scanned in the period of time for which one $x$-conductor is connected through the switch 3 to a voltage source 5 which may supply an alternating voltage having an amplitude of V volt. As a result, the potential difference between the $x$-conductor to which this voltage is applied momentarily and the $y$-conductor connected to earth travels from left to right (the switch 4 rotates in the direction of the inscribed arrow) as successive $y$-conductors are connected to earth. The next $x$-conductor (the switch 3 also rotates in the direction of the inscribed arrow) is then connected to the source 5 and the $y$-conductors are again scanned.

The part of the layer 2 located at the relevant crossing of the conductors concerned has to luminesce each time so that during scanning a luminous spot moves from left to right and from top to bottom.

However, as is known, a cross effect will occur which will be explained more fully with reference to FIGURE 1.

If it is assumed that a conductor $x_i$ is connected through the switch 3 to the source 5 and a conductor $y_j$ is connected to earth through the switch 4, the amplitude of the alternating voltage at the crossing $x_i$, $y_j$ has a value of V volts, but the amplitude of the voltages at the crossings between the conductor $x_i$ and all y-conductors and at the crossings between the conductor $y_j$ and all x-conductors is approximately ½V volts. If ½V volts exceeds the quenching voltage of the electroluminescent material of the layer 2, not only the part of this layer situated at the crossing $x_i$, $y_j$ but also all parts of this layer associated with the cross formed by the conductor $x_i$ and the conductor $y_j$ will luminesce. However, since the voltage set up at the undesired crossings is one half of that at the desired crossing, this latter crossing luminesces from 8 to 10 times more brightly than the undesired crossings owing to the fact that with decrease in the voltage applied the light produced decreases at a more than proportional rate.

However, if the light produced by the crossed-parallel-conductors system were simply used for controlling a circuit arrangement 6 shown in cross-section in FIGURE 2, the desired result would not be obtained.

This circuit arrangement 6 comprises two photoconductive layers 7 and 8 between which opaque auxiliary electrodes 9 in the form of metal islands are interposed, the assembly being sandwiched between two thin transparent electrodes 10 and 11. The entire structure is mounted on a transparent support, for example a glass plate (not shown).

In order to reduce the capacitance value of the capacitor formed by the electrodes 10 and 11 and the layers 7 and 8 to a minimum, the electrodes 10 and 11 are divided into a number of crossed parallel electrodes $10_1$ to $10_N$ (of which FIGURE 2 shows only a conductor $10_j$) and $11_1$ to $11_N$. The number of electrodes $10_1$ to $10_N$ is equal to the number of electrodes $y_1$ to $y_N$, each conductor y being arranged opposite a conductor 10.

The same applies to the electrodes $11_1$ to $11_n$, the number of which is equal to the number of electrodes $x_1$ to $x_n$, each conductor x being arranged opposite a conductor 11. The auxiliary electrodes 9 are small, separated, rectangular, conductive elements, each disposed at one of the crossings of all of the conductors 10 and 11. Their use in defining the spot size and resolution of the system is well-known. The conductors $10_1$ to $10_N$ are directly connected together through a conductor 10' shown diagrammatically and connected to a voltage source 12. Similarly, the conductors $11_1$ to $11_n$ are directly connected to one another through a conductor 11' shown diagrammatically and likewise connected to the source 12 through a load resistor 13. The output voltage can be taken from terminals 13' and 13" of the load resistor 13.

The capacitance value of the capacitor formed by the circuit arrangement 6 must be kept to a minimum since otherwise charging and discharging of this capacitor through the locally reduced resistances constituted by the irradiated parts of the layers 7 and 8 would take too much time preventing the arrangement from being rapidly scanned by means of the crossed-parallel-conductors system 1.

The arrangement 6 serves for recording or converting images into a video signal and for this purpose an image 14 is projected through a lens 15 on to the righthand half of the arrangement 6 so that the conductivity of the layer 8 is increased point by point in accordance with the intensity of the incident light.

The crossed-parallel-conductors system must increase the conductivity of the layer 7 point by point during a scanning cycle, so that the output voltages appearing at the terminals 13' and 13' represent the point by point image intensities on the layer 8 as it is scanned, in the usual manner; however, since instead of a crossing each time a cross luminesces, not only the conductivity of the part of the layer 7 opposite the desired crossing but also that of the part opposite the luminescent cross is increased, although in a lesser degree.

Thus, during the scanning of a certain image point, the voltage source 12 produces a current flowing through the arrangement 6 and the resistor 13 which is not only dependent upon the image point to be scanned but also upon adjacent points.

In order to obviate this disadvantage, according to the principle of the invention, the layer 7 is not a normal photoconductive layer but a so-called superlinear photoconductive layer.

A charcteristic curve of such a superlinear photoconductor is shown in FIGURE 3. In this figure, Z represents the intensity of the light incident upon the layer 7 and G the associated conductivity.

From FIGURE 3 it will be seen that at intensities Z smaller than a threshold value $Z_1$, the conductivity G increases slightly only; however, for intensities exceeding the threshold value $Z_1$ this conductivity increases sharply until the material is saturated. By ensuring that the intensity of the light emitted by the layer 2 at the undesired crossings is below the intensity $Z_1$ and that the intensity of the light emitted at the desired crossing greatly exceeds the value $Z_1$, a considerable difference in current is produced between a desired and an undesired point scanned so that the potential drop across the resistor 13 is substantially determined by the parts of the layers 7 and 8 situated opposite the crossing desired at a certain instant. This enables the circuit arrangement 6 to be correctly scanned without additional steps being taken and without information from adjacent image points materially influencing the information of the image point scanned at the particular instant.

It should be noted that the term light is not to be understood to mean only visible light, but that infrared radiation may also be used to irradiate the layer 7. The main point is that the light emitted by the layer 2 lies within the spectral range to which the layer 7 is sensitive. The layer 7 may consist of cadmium-indium-sulphide ($CdIn_2S_4$) activated with $2 \times 10^{-3}$ copper (Cu) atoms or $2 \times 10^{-3}$ gold (Au) atoms per molecule of cadmium-indium-sulphide to ensure satisfactory matching with a layer 2 consisting of zinc selenide. This cadmium-indium-sulphide material and its method of preparation is described in a copending application, Serial No. 69,752, filed November 16, 1960, now Patent No. 3,104,229.

An alternative example of a superlinear photoconductor consisting of cadmium selenide (CdSe) is described by R. H. Bube in Proceedings of the I.R.E., number 43, 1955, pages 1836 to 1850, specifically on page 1843.

A second possible application of a superlinear photoconductor for avoiding cross effect is shown in FIGURE 4. In this figure, a cross-section of the crossed-parallel-conductors system shown in FIGURE 1 is again designated 1. An arrangement 16 is a circuit arrangement for reproducing television images, the superlinear photoconductive layer 7 and a layer 19 of electroluminescent material being sandwiched between transparent electrodes 17 and 18. Opaque auxiliary electrodes 20 in the form of metal islands are interposed between the former two layers to form an array of conductive elements corresponding to the crossings of the conductors XY, the electrodes 17 and 18 being connected to a source 21 supplying the video signal. The device 16 is mounted on a transparent support (not shown).

If desired, the electrodes 17 and 18 also may be designed as a large number of parallel conductors. However, this is not absolutely necessary since a large number of series-combinations of resistors (7) and capacitors (19) is effectively interposed between the electrodes 17 and 18. Each capacitor (19) must be charged through a resistor (7). Since the capacitors (19) are small, this charge time is sufficiently small. The number of these series-combinations is determined by the number of auxiliary electrodes 20.

The cross effect is avoided in this case also by the use of the superlinear layer 7. By the intensity of the incident light from a desired crossing the conductivity of the layer 7 is increased to a degree such that the voltage across the associated part of the layer 19 for the minimum value of the voltage applied by the source 21 (black level) is exactly equal to the quenching voltage of this layer 19. Hence, for greater values of the voltage supplied by the source 21 the desired part of the layer 19 luminesces. Due to the lesser intensity of the light striking the parts of the layer 7 situated opposite the undesired crossings of the luminescing cross, the conductivity of these parts in increased only to a degree such that the voltage drop across the layer 19 remains below the quenching voltage of this layer at the maximum value of the voltage applied by the source 21 (white level). Hence, undesired points cannot luminesce.

It should be noted that the video-signal supplied by the source 21 is taken from parts of a television receiver (not shown) so that the crossed-parallel-conductors system is scanned by means of the switches 3 and 4 in synchronism with the information of the video-signal. This ensures that the part of the layer 7 situated opposite the part of the layer 19 for which at a certain instant the voltage delivered by the source 21 is intended, is irradiated from the scanner 1 with the highest intensity at that instant.

Obviously, the system shown in FIGURE 4 may also be used for colour television. In this event, the layer 19 is divided into a large number of groups each comprising three strips 19', 19'' and 19''' capable of luminescing red, green and blue light respectively. The electrode 18 is also divided into a large number of groups each comprising three electrodes 18', 18'', 18''' so that each electrode 18' lies over a red strip, each electrode 18'' over a green strip and each electrode 18''' over a blue strip.

All electrodes 18' are directly connected to one another and to a source 21' supplying the red video signal, while all electrodes 18'' are directly connected to one another and to a source 21'' supplying the green video signal, all electrodes 18''' being connected to one another and to a source 21''' supplying the blue video signal. The direction of length of the strips 19', 19'' and 19''' extends parallel to the direction of the x-conductors and the width of an x-conductor is substantially equal to the common width of three colour strips. Thus, the luminous spot produced by the crossed-parallel-conductors system scans a part of the layer 7 having a width equal to the width of the strips 19', 19'' and 19''', sources 21', 21'' and 21''' ensuring that during this scanning the correct voltages are applied to the electrodes 18', 18'' and 18'''.

A further alternative application is shown in FIGURE 5. A crossed-parallel-conductors system 1 irradiates a reading-out device 23 through a punched card 22. This reading-out device comprises transparent electrodes $24_1$ to $24_N$ which are connected to one another and are arranged similarly to the electrodes $10_1$ to $10_N$ of FIGURE 2, only the electrode $24_j$ being shown in FIGURE 5, and opaque electrodes $25_1$ to $25_n$ which are connected to one another and arranged similarly to the electrodes $11_1$ to $11_n$ of FIGURE 2. A superlinear photoconductive layer 7 is interposed between the electrodes 24 and 25. The device 23 is fed from a source 26 which is connected to a conductor 24' shown diagrammatically and also through a resistor 27 to a conductor 25' shown diagrammatically also. The conductor 24' connects the electrodes $24_1$ to $24_N$ together and the conductor 25' does the same for the electrodes $25_1$ to $25_n$. The output voltage produced across the resistor 27 is applied to a machine 28 in which the coded information stored in the punched card is processed in a known manner.

The luminous spot produced by the crossed-parallel-conductors system scans the card 22 and at a point at which a hole is punched in this card the light is passed so as to strike the layer 7. Thus, the code of the card 22 is converted into an electric signal as a function of time so that the information of the card 22 is successively fed to the machine 28.

It may be desirable for the upper row and/or the front column of the punched card 22 to be scanned first since the holes provided therein may indicate the coding of the information recorded in the remaining rows and/or columns. In order to scan the upper row, the switch 3 is connected to the conductor $x_1$ and the switch 4 successively connects the conductors $y_1$ to $y_N$ to earth. In order to scan the front column, the switch 4 connects the conductor $y_1$ to earth and then the switch 3 scans the conductors $x_1$ to $x_n$.

However, since during scanning not only the part of the layer 2 associated with the desired crossing but also an entire cross luminesces, light is radiated through all the holes facing this cross.

By the use of the superlinear photoconductive layer 7 an effective threshold is obtained so that the voltage across the resistor 27 is maintained very low unless a hole exactly opposes the instantaneously scanned crossing.

It will be appreciated that the information may not be stored in a punched card but in a crossed-parallel-conductors system provided with the electroluminescent layer 2, as will be described more fully with reference to FIGURE 6, which shows an arrangement as described in copending patent application Serial No. 44,503, filed July 21, 1960.

To this end, FIGURE 6a again shows the crossed-parallel-conductors system of FIGURE 1. However, the switches 3 and 4 are subdivided into a number of switches $3_1$ to $3_n$ and $4_1$ to $4_N$ which each can be closed separately depending upon whether an x-conductor is to be connected to the source 5 or a y-conductor is to be connected to earth. At the crossings capacitors are shown which represent the electroluminescent elements formed by the layer 2 at these crossings.

A second crossed-parallel-conductors system shown in FIGURE 6b is associated with the crossed-parallel-conductors system of FIGURE 6a. In this second crossed-parallel-conductors system conductors $x_1'$ to $x_n'$ are connected to earth while conductors $y_1'$ to $y_N'$ can each be connected separately through switches $29_1$ to $29_N$ to an alternating-voltage source 30. Two layers are interposed between the two groups of conductors $x'$ and $y'$. A first layer 31 consists of electroluminescent material and in FIGURE 6b this layer is shown only at the crossings in the form of capacitors since these constitute the electroluminescent elements at the crossings of the second crossed-parallel-conductors system.

A second layer 32 consists of a superlinear photoconductor which can be irradiated by the crossed-parallel-conductors system shown in FIGURE 6a. The layer 32 is shown only in the form of resistors at the crossings, since these constitute the photoconductive resistance elements at these crossings. In this second crossed-parallel-conductors system, optical feed-back from the elements 31 to the elements 32 is produced by transparent auxiliary electrodes 36 in the form of metal islands interposed between the layers 31 and 32.

Hence, if an element 31 luminesces, the radiation of this element strikes the element 32 with which it is connected in series so that when the associated switch 29 is closed, the element 31 concerned persists in emitting light even if the radiation from the first crossed-parallel-conductors system is terminated by either of the switches 3 or 4 being opened.

In FIGURE 6c, a third crossed-parallel-conductors system is shown which is associated with the crossed-parallel-conductors system shown in FIGURE 6b. Between the two groups of conductors $x''$ and $y''$ of this third system, a photoconductive layer 33 is interposed which can be irradiated from the second system.

A possible arrangement of the three associated systems is shown in FIGURE 7. In this figure, the crossed-parallel-conductors systems of FIGURES 6a, 6b and 6c are designated 1, 34 and 35, respectively. The three systems are mounted in an optically transparent but electrically insulating support, for example glass (not shown), so that they are relatively fixed.

The assembly operates as follows:

Let it be assumed that switches $3_i$, $4_j$ and $29_j$ are closed. The elements 2 associated with the cross constituted by conductors $x_i$ and $y_j$ will luminesce. Their radiation strikes the elements 32 coupled to conductors $y_j'$ and $x_i'$. Since the $x$-conductors are connected to earth, a potential difference is produced only across the series-combinations of elements 31 and 32 one end of which is connected to the conductor $y_j'$. Hence, only the elements 31 associated with the conductor $y_j'$ are enabled to luminesce. However, the element 2 associated with the crossing $x_i$, $y_j$ emits a radiation which is from 8 to 10 times brighter than that of the remaining elements 2 associated with the luminescing cross, so that the element 32 of superlinear photoconductive material at the crossing $x_i'$, $y_j'$ is irradiated with a materially greater intensity than the remaining elements 32 associated with the conductor $y_j'$. The system is proportioned so that the element 32 at the crossing $x_i'$, $y_j'$ is irradiated with an intensity greater than $Z_1$ (FIG. 3) and all remaining elements 32 associated with the conductor $y_j'$ with an intensity smaller than $Z_1$. Consequently, only the voltage set up across the elements 31 associated with the crossing $x_i'$, $y_j'$ exceeds the quenching voltage so that solely this element luminesces. Its radiation strikes the element 32 with which it is connected in series so that the element 31 persists in emitting radiation as long as the switch $29_j$ is closed, even if the switches $3_i$ and $4_j$ are opened.

The radiation from the element 31 at the crossing $x_i'$, $y_j'$ strikes a photoconductive element 33 at a crossing $x_i''$, $y_j''$ of the third crossed-parallel-conductors system. By this radiation, the impedance of this element is considerably reduced, for example by a factor of $10^6$ ohms, so that the conductor $x_i''$ is directly connected to the conductor $y_j''$. This connection can be broken by opening the switch $29_j$ so that the radiation of the element 32 at the crossing $x_i'$, $y_j'$ collapses.

Any conductor $x''$ may similarly be connected to any conductor $y''$.

The layer 32 may have the same composition as the layer 7 of FIGURES 2, 4 and 5. In the simplest case, the layer 33 has the same composition as the layer 32 so that the composition of the layer 31 can be the same as that of the layer 2. Thus, no difficulty is experienced in matching the radiation from the layer 31 which must lie within a spectral range to which both the layer 32 and the layer 33 respond, while it makes no difference whether the layer 33 consists of superlinear photoconductive material or of normally photoconductive material. The radiation emitted by the elements 31 can be made sufficiently large to exceed the required intensity $Z_1$.

It will be appreciated that the switches 3, 4 and 29, which are shown as mechanical switches, may alternatively be electronic switches, for example discharge tubes or transistors or photoconductive resistors comprising electroluminescent elements, as described in the copending patent application Serial No. 59,356, filed September 29, 1960.

What is claimed is:

1. In combination, a crossed-parallel-conductors system comprising two groups of parallel crossing conductors and a layer of electroluminescent material disposed between the said two conductor groups, and switching means for selectively applying a potential difference between any two crossing conductors of the groups, whereby the region of the electroluminescent material at the selected crossing emits radiation substantially above a given intensity value and neighboring regions of the electroluminescent material, due to capacitive coupling, at non-selected crossings also emit radiation but with an intensity below said given value; and an associated circuit arrangement adapted to be activated by the radiation emitted from the said crossed-parallel-conductors system, said circuit arrangement including conductive means coupled to a layer of photoconductive material arranged generally opposite and parallel to the system for receiving the radiation emitted thereby to selectively reduce the impedance of the region of the photoconductive layer irradiated by the associated selected region of the system, said photoconductive layer having a superlinear conductivity vs. radiation intensity characteristic in which its conductivity remains low below a threshold value of radiation intensity and its conductivity sharply increases above said threshold value, said threshold value substantially corresponding to the aforesaid given intensity value, whereby the photoconductive region irradiated by the associated selected region of the system exhibits the desired low impedance, whereas other photoconductive regions irradiated by the non-selected regions of the system continue to exhibit high impedance.

2. The combination of claim 1 wherein the circuit arrangement comprises, in the order named starting from the side adjacent the system, a first group of transparent parallel conductors, a first layer of said superlinear photoconductive material, a second layer of non-superlinear photoconductive material, and a second group of transparent parallel conductors.

3. The combination of claim 2 wherein the system operates to light-scan, point-by-point, the superlinear photoconductive layer, means are provided for forming a light image on the non-superlinear photoconductive layer, and means are provided for deriving a video signal from the first and second conductor groups of the circuit arrangement.

4. The combination of claim 2 wherein opaque auxiliary electrodes are disposed between the two photoconductive layers.

5. In combination, a crossed-parallel-conductors, light scanning system comprising two groups of parallel crossing conductors and a layer of electroluminescent material disposed between the said two conductor groups, and switching means for selectively applying a potential difference between any two crossing conductors of the groups, whereby the region of the electroluminescent material at the selected crossing emits radiation substantially above a given intensity value and neighboring regions of the electroluminescent material, due to capacitive coupling, at non-selected crossings also emit radiation but with an intensity below said given value; and an associated circuit arrangement adapted to be activated by the radiation emitted from the said crossed-parallel-conductors system, said circuit arrangement including transparent electrode means on opposite sides of a layer of photoconductive material arranged generally opposite and parallel to the system for receiving the radiation emitted thereby to selectively reduce the impedance of the region of the photoconductive layer irradiated by the associated selected region of the system and a second electroluminescent layer, said photoconductive layer having a superlinear conductivity vs. radiation intensity characteristic in which its conductivity remains low below a threshold value of radiation intensity and its conductivity sharply increases above said threshold value, said threshold value substantially corresponding to the aforesaid given intensity value whereby the photoconductive region irradiated by the associated selected region of the system exhibits low impedance, whereas other photoconductive regions irradiated by the non-selected regions of the system continue to exhibit high impedance, and means for applying to the electrode means a voltage capable of causing the region of the second electroluminescent layer adjacent to the irradiated region of the photoconductive layer to change its emission condition.

6. The combination of claim 5 as an image reproducer wherein the voltage applying means includes a source of video signals synchronized with the switching means for causing the second electroluminescent layer to produce a visible image.

7. The combination of claim 5 wherein the electrode means of the circuit arrangement includes two groups of parallel crossed conductors, and another arrangement comprising two groups of parallel-crossed conductors and an intervening photoconductive layer is provided to be activated by the radiation emitted by the second electroluminescent layer, additional switching means being provided for selectively applying potentials between crossed conductors of the said electrode means.

References Cited in the file of this patent

UNITED STATES PATENTS

| | | |
|---|---|---|
| 2,342,245 | Bruce et al. | Feb. 22, 1944 |
| 2,727,685 | Wilson | Dec. 20, 1955 |
| 2,789,193 | Anderson | Apr. 16, 1957 |
| 2,874,308 | Livingston | Feb. 17, 1959 |
| 2,877,371 | Orthuber et al. | Mar. 10, 1959 |
| 2,905,830 | Kazan | Sept. 22, 1959 |
| 2,915,641 | Rothschild | Dec. 1, 1959 |
| 2,930,897 | Livingston | Mar. 29, 1960 |
| 2,958,009 | Bowerman | Oct. 25, 1960 |
| 2,988,647 | Duinker et al. | June 13, 1961 |
| 3,046,540 | Litz et al. | July 24, 1962 |

FOREIGN PATENTS

| | | |
|---|---|---|
| 1,145,946 | France | May 13, 1957 |

OTHER REFERENCES

Keller: IBM Technical Disclosure Bulletin, vol. 1, No. 1; June 1958; page 38.